United States Patent
Remington, Jr. et al.

(10) Patent No.: US 9,938,185 B2
(45) Date of Patent: Apr. 10, 2018

(54) ANTIREFLECTIVE COATING FOR GLASS CONTAINERS

(75) Inventors: Michael P. Remington, Jr., Toledo, OH (US); Pramod K. Sharma, Ann Arbor, MI (US); Daniel Baker, Decatur, IL (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 275 days.

(21) Appl. No.: 13/539,808

(22) Filed: Jul. 2, 2012

(65) Prior Publication Data

US 2014/0001075 A1 Jan. 2, 2014

(51) Int. Cl.
*C08J 7/04* (2006.01)
*C03C 17/00* (2006.01)

(52) U.S. Cl.
CPC .......... *C03C 17/005* (2013.01); *C03C 17/009* (2013.01); *C03C 2217/732* (2013.01)

(58) Field of Classification Search
CPC ............ C03C 17/005; C03C 2217/732; C03C 17/009
USPC ........................................................ 427/515
See application file for complete search history.

(56) References Cited

U.S. PATENT DOCUMENTS

| | | | |
|---|---|---|---|
| 3,001,329 A * | 9/1961 | Long | 65/69 |
| 3,522,075 A | 7/1970 | Kiel | |
| 3,853,673 A | 12/1974 | Levene et al. | |
| 3,912,100 A | 10/1975 | Graham et al. | |
| 4,348,462 A | 9/1982 | Chung | |
| 4,436,851 A | 3/1984 | Vaughn, Jr. | |
| 4,455,205 A | 6/1984 | Olson et al. | |
| 4,474,857 A | 10/1984 | Vaughn, Jr. | |
| 4,486,504 A | 12/1984 | Chung | |
| 5,104,929 A | 4/1992 | Bilkadi | |
| 5,221,560 A | 6/1993 | Perkins et al. | |
| 5,260,350 A | 11/1993 | Wright | |
| 5,296,295 A | 3/1994 | Perkins et al. | |
| 5,374,483 A | 12/1994 | Wright | |
| 5,385,955 A | 1/1995 | Tarshiani et al. | |
| 5,907,000 A | 5/1999 | Treadway | |
| 6,342,097 B1 | 1/2002 | Terry et al. | |
| 6,921,578 B2 | 7/2005 | Tsujino et al. | |
| 7,241,505 B2 | 7/2007 | Glaubitt et al. | |
| 7,264,872 B2 | 9/2007 | Walker, Jr. et al. | |
| 7,575,809 B2 | 8/2009 | Glaubitt et al. | |
| 7,604,866 B2 | 10/2009 | Ohashi et al. | |
| 7,767,253 B2 | 8/2010 | Sharma | |
| 7,781,493 B2 | 8/2010 | Baikerikar et al. | |
| 7,786,183 B2 | 8/2010 | Baikerikar et al. | |
| 7,923,063 B2 | 4/2011 | Disteldorf et al. | |

(Continued)

FOREIGN PATENT DOCUMENTS

EP        1995260    * 11/2008 ............ C08F 290/06

OTHER PUBLICATIONS

Xia, Jianrong, et al., UV-induced polymerization of urushiol without photoinitiator, Progress in Organic Coatings, 61, (2008), pp. 7-10.

(Continued)

*Primary Examiner* — Robert S Walters, Jr.

(57) ABSTRACT

A glass container and related methods of manufacturing and coating glass containers. The glass container includes an inorganic-organic hybrid coating over at least a portion of an exterior surface of a glass substrate.

17 Claims, 2 Drawing Sheets

(56) References Cited

U.S. PATENT DOCUMENTS

| | | |
|---|---|---|
| 7,923,507 B2 | 4/2011 | Wrolson |
| 2007/0074757 A1 | 4/2007 | Mellott et al. |
| 2007/0116966 A1 | 5/2007 | Mellott et al. |
| 2007/0238804 A1 | 10/2007 | Ho et al. |
| 2008/0072956 A1 | 3/2008 | Sharma et al. |
| 2008/0185041 A1 | 8/2008 | Sharma et al. |
| 2008/0220152 A1 | 9/2008 | Sharma |
| 2008/0248223 A1* | 10/2008 | Niederst et al. ............ 428/34.7 |
| 2008/0271782 A1 | 11/2008 | Sharma |
| 2008/0295884 A1 | 12/2008 | Sharma et al. |
| 2008/0311408 A1 | 12/2008 | Treadway |
| 2009/0025776 A1 | 1/2009 | Varaprasad |
| 2009/0025777 A1 | 1/2009 | Varaprasad |
| 2009/0075092 A1 | 3/2009 | Varaprasad |
| 2009/0101203 A1 | 4/2009 | Sharma |
| 2009/0101209 A1 | 4/2009 | Sharma et al. |
| 2009/0133748 A1 | 5/2009 | Sharma |
| 2009/0148709 A1 | 6/2009 | Disteldorf et al. |
| 2009/0181256 A1 | 7/2009 | Sharma |
| 2010/0024874 A1 | 2/2010 | Varaprasad |
| 2010/0190010 A1 | 7/2010 | Treadway |
| 2010/0269901 A1 | 10/2010 | Sharma |
| 2010/0297432 A1 | 11/2010 | Sherman et al. |
| 2010/0304113 A1 | 12/2010 | Chang et al. |
| 2010/0317788 A1 | 12/2010 | Schutyser et al. |
| 2010/0330359 A1 | 12/2010 | Ishikawa et al. |
| 2011/0003130 A1 | 1/2011 | Marchet et al. |
| 2011/0034620 A1 | 2/2011 | Higuchi |
| 2011/0104502 A1 | 5/2011 | Calixto Martinez et al. |
| 2011/0108101 A1 | 5/2011 | Sharma et al. |
| 2011/0135905 A1 | 6/2011 | Wakita et al. |
| 2011/0223421 A1 | 9/2011 | Harimoto et al. |
| 2011/0250346 A1 | 10/2011 | Remington, Jr. et al. |
| 2011/0250442 A1 | 10/2011 | Castro et al. |

OTHER PUBLICATIONS

Wang, Huiliang, et al., Self-Initiated Photopolymerization and Photgrafting of Acrylic Monomers, Macromolecular Rapid Communications, 2004, 25 pp. 1095-1099.

Soo Hee Lee et al, "Organic-Inorganic Hard Coating Layer Formation on Plastic Substrate by UV Curing Process", Macromolecular Research, vol. 18, No. 1, Jan. 1, 2010, pp. 40-46, XP055086351, ISSN: 1598-5032.

Yung-Hoe Han et al, "UV Curing of Organic-Inorganic Hybrid Coating Materials", Journal of Sol-Gel Science and Technology, Kluwer Academic Publishers, BO, vol. 43, No. 1, Apr. 13, 2007, pp. 111-123, XP019505481, ISSN: 1572-4846.

Schottner G, "Hybrid Sol-Gel Derived Polymers: Applications of Multifunctional Materials", Chemistry of Materials, American Chemical Society, Washington, US, vol. 13, No. 10, Jan. 1, 2001, pp. 3422-3435, XP002526961, ISSN: 0897-4756.

PCT Search Report and Written Opinion, Serial No. PCT/US2013/045787, Filing Date: Jun. 14, 2013, Applicant: Owens-Brockway Glass Container Inc., dated Nov. 11, 2013.

* cited by examiner

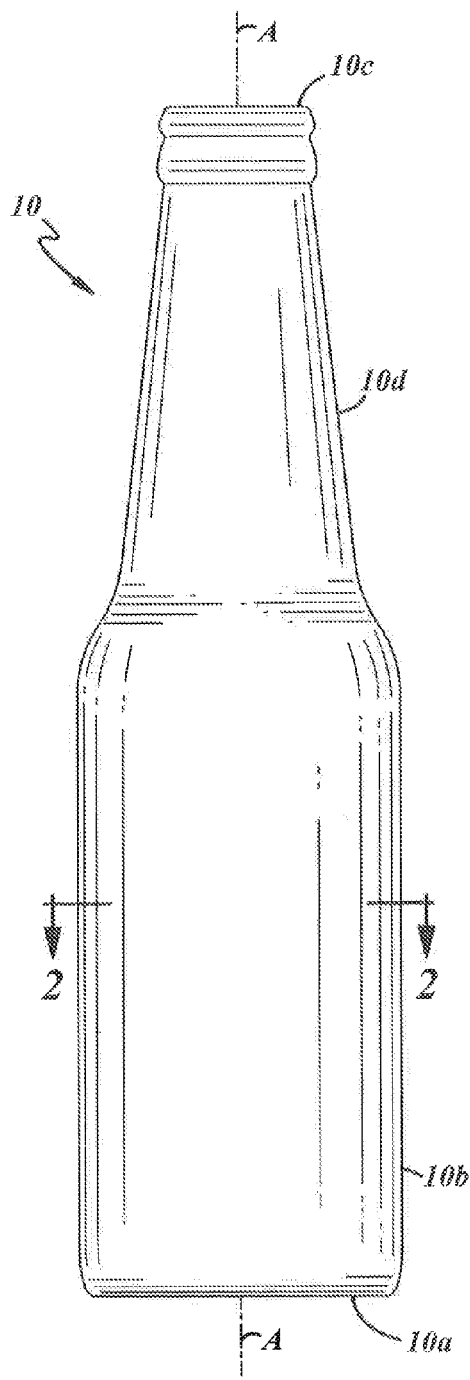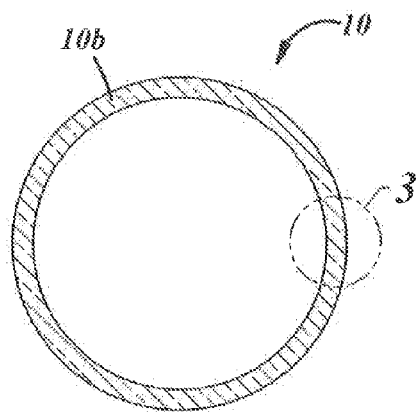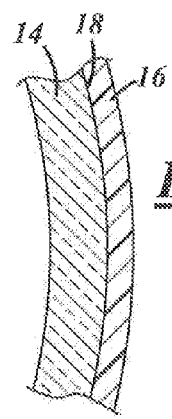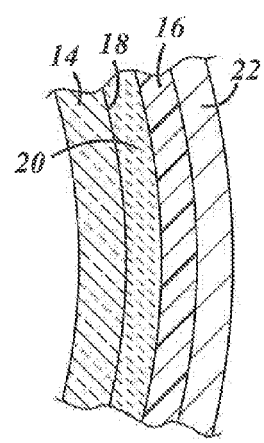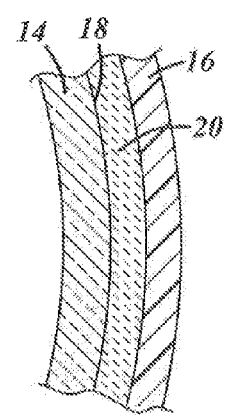
FIG. 1
FIG. 2
FIG. 3
FIG. 3A
FIG. 3B

ANTIREFLECTIVE COATING FOR GLASS CONTAINERS The present disclosure is directed to glass containers, and coating processes for glass containers including methods and materials for coating glass containers (e.g., glass bottles and jars).

BACKGROUND AND SUMMARY OF THE DISCLOSURE

Various processes have been developed to apply coatings to glass containers for different purposes, including glass strengthening for damage prevention and fragment retention. For example, U.S. Pat. No. 3,522,075 discloses a process for coating a glass container in which the glass container is formed, coated with a layer of metal oxide such as tin oxide, cooled through a lehr, and then coated with an organopolysiloxane resin-based material over the metal oxide layer. In another example, U.S. Pat. No. 3,853,673 discloses a method of strengthening a glass article by, for example, applying to a surface of the article a clear solution of a soluble, further hydrolyzable metallosiloxane, and maintaining the glass article at an elevated temperature sufficiently high to convert the metallosiloxane to a heat-treated polymetallosiloxane gel structure. In a further example, U.S. Pat. No. 3,912,100 discloses a method of making a glass container by heating the glass container and applying a polyurethane powder spray to the glass container.

A general object of the present disclosure is to provide an improved method of applying, to a glass container, a coating that reduces light reflectivity.

The present disclosure embodies a number of aspects that can be implemented separately from or in combination with each other.

A method of applying an inorganic-organic hybrid coating having anti-reflective properties to a glass container may include the step of (a) applying a coating composition over an exterior surface of a glass substrate that defines a shape of the glass container. The coating composition applied in step (a) may comprise (1) a UV curable organofunctional silane that includes an alkoxy functional group and an acrylic ester functional group, (2) colloidal silica, (3) water, (4) a catalyst, and (5) an organic solvent. The method may further include the step of (b) exposing the coating composition to UV light for a time sufficient to cure the coating composition into a transparent monolithic inorganic-organic hybrid coating that comprises an inorganic polymer component and an organic polymer component. The inorganic-organic hybrid coating may provide an optical transmission gain relative to the glass substrate of at least 1% for light at a wavelength of 555 nm.

In accordance with another aspect of the disclosure, there is provided a method of applying an inorganic-organic hybrid coating having anti-reflective properties to a glass container. The method may include the steps of (a) providing a glass container that includes a soda-lime glass substrate that defines a shape of the container; (b) applying a coating composition over an exterior surface of the glass substrate; and (c) exposing the coating composition to UV light for a time sufficient to cure the coating composition into a monolithic inorganic-organic hybrid coating. The coating composition applied in step (b) may comprise (1) a UV curable organofunctional silane that includes an alkoxy functional group and an acrylic ester functional group, (2) colloidal silica, (3) water, (4) a catalyst, and (5) an organic solvent. A photoinitiator and a non-silane monomer or polymer that includes an acryl functional group or an epoxide functional group may be excluded from the coating composition.

In accordance with an additional aspect of the disclosure, there is provided a glass container that may include an axially closed base at an axial end of the glass container, a body extending axially from the base and being circumferentially closed, and an axially open mouth at another end of the glass container opposite of the base. The glass container may also include an inorganic-organic hybrid coating over an exterior surface of the glass substrate. The inorganic-organic hybrid coating may comprise an inorganic polysiloxane polymer component and an organic polyacrylic polymer component, and may further provide an optical transmission gain of at least 1% relative to the glass substrate for light at a wavelength of 555 nm.

BRIEF DESCRIPTION OF THE DRAWINGS

The disclosure, together with additional objects, features, advantages and aspects thereof, will be best understood from the following description, the appended claims and the accompanying drawings, in which:

FIG. 1 is an elevational view of a glass container in accordance with an exemplary embodiment of the present disclosure;

FIG. 2 is a cross-sectional view of the glass container body before coating;

FIG. 3 is an enlarged sectional view of the glass container, taken from circle 3 of FIG. 1;

FIG. 3A is a sectional view of a glass container according to another embodiment;

FIG. 3B is a sectional view of a glass container according to a further embodiment.

DETAILED DESCRIPTION OF PREFERRED EMBODIMENTS

Figure 4:
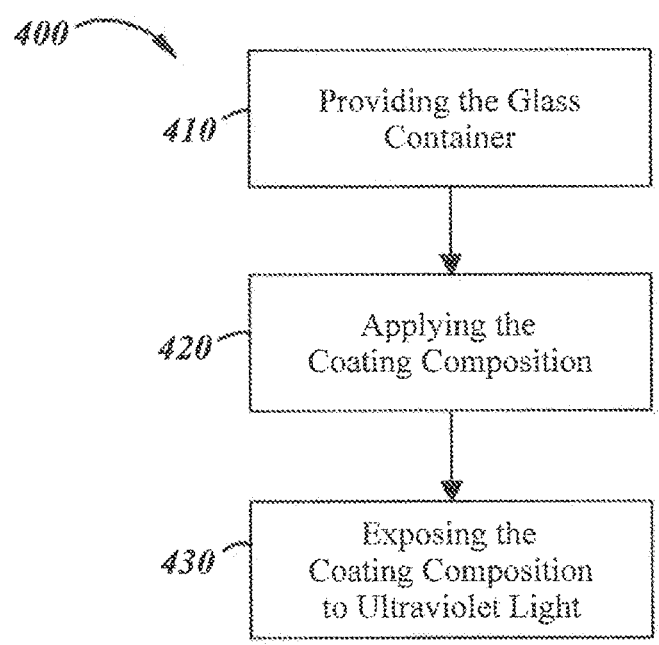
FIG. 4 is a flow diagram that illustrates a method of applying an inorganic-organic hybrid coating to a glass container.

FIG. 1 illustrates an exemplary embodiment of a glass container 10 that may be produced in accord with an exemplary embodiment of a manufacturing process presently disclosed hereinbelow. The glass container 10 includes a longitudinal axis A, a base 10a at one axial end of the container 10 that is closed in an axial direction, a body 10b extending in an axial direction from the axially closed base 10a, and a mouth 10c at another axial end of the container 10 opposite of the base 10a. Accordingly, the glass container 10 is hollow. In the illustrated embodiment, the container 10 also includes a neck 10d that may extend axially from the body 10b, may be generally conical in shape, and may terminate in the mouth 10c. However, the container 10 need not include the neck 10d and the mouth 10c may terminate the body 10b, such as in a glass jar embodiment or the like. The body 10b may be of any suitable shape in cross-section transverse to the axis A as long as the body 10b is circumferentially closed.

As shown in FIG. 2, for example, the body 10b may be of cylindrical transverse cross-sectional shape that is circumferentially closed. In other embodiments, the body 10b may be generally oval, square, rectangular, or of any other suitable transverse cross-sectional shape. As used herein, the term "circumferentially" applies not only to circular or cylindrical transverse cross-sectional shapes but also applies to any transverse cross-sectional shape.

The glass container 10, as shown best in FIGS. 3-3B, includes a glass substrate 14 that defines its shape. The glass substrate 14 is preferably comprised of soda-lime glass. This type of glass is comprised primarily of silica ($SiO_2$) with soda ($Na_2O$) and lime (CaO) being the other major constituents. A typical soda-lime glass composition may include, for example, about 60 wt. % to about 75 wt. % silica, about 12 wt. % to about 18 wt. % soda, and about 5 wt. % to about 12 wt. % lime. Smaller amounts of additives may also be included in soda-lime glass. These additives usually include one or more of the following: about 0-2 wt. % alumina ($Al_2O_3$), about 0-4 wt. % magnesia (MgO), about 0-1.5 wt. % potash ($K_2O$), about 0-1 wt. % iron oxide ($Fe_2O_3$), about 0-0.5 wt. % titanium oxide ($TiO_2$), and about 0-0.5 wt. % sulfur trioxide ($SO_3$). Other alternative glass compositions known to skilled artisans may of course be used to make the glass substrate 14 besides soda-lime glass. A few examples of other suitable glass compositions include borosilicate glass, quartz, or any other type of glass that exhibits a refractive index greater than or equal to 1.50.

An inorganic-organic hybrid coating 16 may be disposed over an exterior surface 18 of the glass substrate 14. The inorganic-organic hybrid coating 16 may be directly applied to the exterior surface 18 of the glass substrate 14 as shown in FIG. 3. In other embodiments, however, the inorganic-organic hybrid coating 16 may be applied over another, different coating already present on the glass substrate 14. For example, as shown in FIG. 3A, the inorganic-organic hybrid coating 16 may be applied to a hot-end coating 20 that has been deposited onto the exterior surface 18 after formation of the glass substrate 14 but before annealing. The hot-end coating 20 may comprise tin oxide or any other suitable material(s). As such, application of the inorganic-organic hybrid coating 16 over the exterior surface 18 encompasses direct application to the exterior surface 18 as well as the application to one or more coatings that are already present (i.e., situated radially inward of the coating 16) on the exterior surface 18. One or more coatings may also be applied over (i.e., radially outward of) the inorganic-organic hybrid coating 16 if warranted. For example, as shown in FIG. 3B, a cold-end coating 22 may be applied over the inorganic-organic hybrid coating 16 anytime after the glass substrate 14 has been annealed. The cold-end coating 22 may comprise polyethylene wax or any other suitable material(s).

The inorganic-organic hybrid coating 16 may be a transparent film material that contains a polysiloxane inorganic polymer component and a polyacrylic organic polymer component. These inorganic and organic polymer components are bonded together within the same polymer network and can molecularly interact with one another to synergistically provide the coating 16 with desirable properties. Merging the properties typically associated with inorganic and organic polymers, for instance, can furnish the inorganic-organic hybrid coating 16 with a high optical transparency, excellent abrasion and impact resistance, a relatively high thermal stability, sufficient hardness and flexibility, and/or a suitable adhesiveness. The inorganic-organic hybrid coating 16 can thus contribute to the enhancement of one or more properties of the underlying glass substrate 14 when applied over the exterior surface 18. Most notably, and as further explained below, the inorganic-organic hybrid coating 16 may reduce light reflectivity from the glass substrate 14 within the visible spectrum, thus improving the clarity of the glass container 10.

The inorganic-organic hybrid coating 16 may be the UV cured reaction product of a coating composition that comprises (1) a UV curable organofunctional silane and (2) colloidal silica. Other substances may also be included in the coating composition to help facilitate inorganic and organic polymerization of the UV curable organofunctional silane during formation of the inorganic-organic hybrid coating 16. For example, in addition to the UV curable organofunctional silane and the colloidal silica, the coating composition may further include (3) water, (4) a catalyst, and (5) an organic solvent. The coating composition, moreover, preferably does not include a photoinitiator or any polymerizable non-silane organic compounds—although the exclusion of such compounds is not mandatory in all instances. A non-silane organic compound is any organic monomer or polymer considered not to be a silane due to the absence of a silicon atom that supports one or more functional groups. Non-silane monomers and polymers that include an acryl functional group (e.g., acrylates, including methacrylates, and other compounds that include an α-β unsaturated carbonyl functional group) or an epoxide functional group (e.g., polyepoxide resins) are a few particular polymerizable non-silane organic compounds that are preferably excluded from the coating composition.

The UV curable organofunctional silane may be a silane compound that includes at least two different functional groups. One of those functional groups may be an alkoxy functional group (—OR) and the other may be an acrylic ester functional group (—$OCOCCH_2R$). Each of those groups is polymerizable. The alkoxy functional group, more specifically, can undergo hydrolytic polycondensation with the alkoxy functional groups of other organofunctional silane compounds and with the surface hydroxide groups of the colloidal silica to form an inorganic polysiloxane polymer component (i.e., Si—O—Si linkages between organofunctional silane compounds and/or colloidal silica). The acrylic functional group, on the other hand, can undergo addition polymerization with other acrylic ester functional groups to form an organic polyacrylic polymer component (i.e., C—C linkages between organofunctional silane compounds). A photoinitiator is not necessarily required to initiate such addition polymerization because the acrylic functional groups can self-initiate—that is, they can experience bond cleavages that result in free radicals—when exposed to UV light. The inorganic polysiloxane and the organic polyacrylic components produced by the polymerization of the organofunctional silane can form a hybrid polymer network in which the inorganic and organic polymer components molecularly interact with one another—both intermolecularly and intramolecularly—to provide the coating 16 with its desired properties. The UV curable organofunctional silane may include a single silane compound or several different types of silane compounds.

In a preferred embodiment, the alkoxy functional group is a methoxy or ethoxy group, and the acrylic ester functional group is an acryloxy group or a methacryloxy group. A specific example of a suitable UV curable organofunctional silane is methacryloxypropyltrimethoxysilane (MAPTMS). The chemical structure of MAPTMS is shown below. As shown, MAPTMS includes three methoxy groups and one methacryloxy group. MAPTMS is commercially available from a variety of companies including Gelest, Inc. (headquartered in Morrisville, Pa.). Other UV curable organofunctional silanes that may be employed include acryloxypropyltrimethoxysilane and dimethoxyacryloxypropyldimethoxysilane. The chemical structure of each of these organofunctional silanes is also shown below.

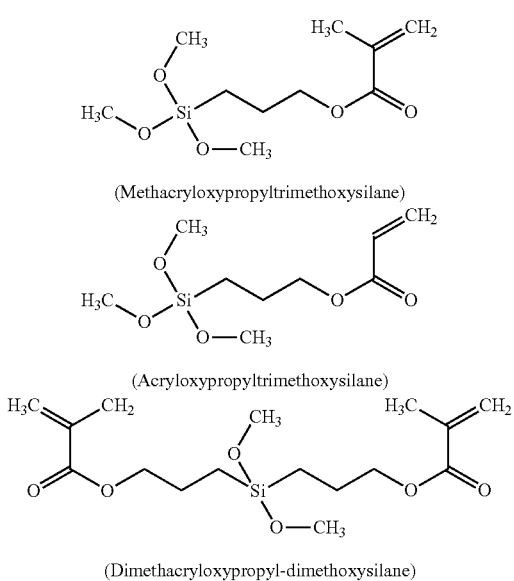

(Methacryloxypropyltrimethoxysilane)

(Acryloxypropyltrimethoxysilane)

(Dimethacryloxypropyl-dimethoxysilane)

The colloidal silica is a dispersion of submicron-sized silica ($SiO_2$) particles in a liquid medium. The silica particles have particle sizes defining their largest dimensions that range from about 1 nm to about 200 nm, more preferably from about 5 nm to about 100 nm, and most preferably from about 5 nm to about 50 nm. The liquid medium in which the silica particles are dispersed can assume a variety of environments. The liquid may be aqueous or organic and its pH may range from acidic to alkaline. A typical liquid medium may be comprised of water, an aliphatic alcohol, or a blend of water and an aliphatic alcohol, with an acid or salt typically being added to promote acidity or alkalinity, respectively. A pH of the liquid medium that ranges anywhere from about 2.0 to about 9.0 may be suitable. The silica particle content of the colloidal silica may range from about 20 wt. % to about 50 wt. %, based on the weight of both the silica particles and the liquid medium, depending on various considerations including the size of the silica particles. A suitable colloidal silica for use in the preparing the coating composition can be obtained commercially from BYK-Chemie (headquartered in Wesel, Germany).

The UV curable organofunctional silane and the colloidal silica may be physically mixed or chemically affiliated, or both, when initially introduced into the coating composition. Physical mixing is present when the UV curable organofunctional silane and the colloidal silica are mixed together, but are not chemically bonded to each other. Chemical affiliation is present when the silica particles of the colloidal silica are functionalized with the UV curable organofunctional silane through conventional grafting reactions. Such grafting results in UV curable organofunctional silane compounds being chemically bonded to the surfaces of the silica particles through siloxane bonds formed at the alkoxy functional group location. The acrylic ester functional groups remain more distally located relative to the silica particles.

The coating composition may include water, the catalyst, and the organic solvent to help facilitate inorganic and organic polymerization of the UV curable organofunctional silane, as previously mentioned. The water may be added to induce hydrolysis of the alkoxy functional group to form an intermediate reactive group, typically a hydroxide, capable of participating in a polycondensation reaction. The catalyst may be added to promote at least one, and preferably both, of the hydrolysis of the alkoxy functional group and the polycondensation of the intermediate group to ultimately produce the inorganic polysiloxane polymer component. A preferred catalyst is an acid such as, for example, glacial acetic acid, hydrochloric acid, sulfuric acid, nitric acid, and combinations thereof. And finally, the organic solvent may be added to provide a compatible liquid which allows the coating composition to achieve and maintain a homogeneously mixed state when originally prepared. A preferred organic solvent is a C1-C6 aliphatic alcohol such as methanol, ethanol, n-propanol, isopropanol, butanol, and combinations thereof.

The coating composition may be formulated so that the inorganic-organic hybrid coating 16 exhibits anti-reflective properties sufficient to improve the optical clarity of the underlying glass substrate 14. The inorganic-organic hybrid coating 16 preferably provides an optical transmission gain relative to the underlying glass substrate 14 of at least 1.0% for light at a wavelength of 555 nm; that is, the inorganic-organic hybrid coating 16 increases the percentage of light at 555 nm that passes through the glass substrate 14 by at least 1% when compared to the glass substrate 14 itself. The inorganic-organic hybrid coating preferably further provides an average optical transmission gain of at least 1.0% relative to the underlying glass substrate 14 over a wavelength range of 380 nm to 750 nm. Such anti-reflective properties may be imparted to the inorganic-organic hybrid coating 16 when, for example, the coating composition comprises, by weight percent based on the total weight of the coating composition, about 1.0% to about 6.0% of the UV curable organofunctional silane, about 1.0% to about 6.0% of the colloidal silica, about 0.10% to about 5.0% water, about 1.0% to about 10% of the catalyst, and about 78% to about 98% of the organic solvent.

The thickness of the inorganic-organic hybrid coating 16 may range from about 100 nm to about 200 nm, preferably about 130 nm, and the coating 16 may be monolithic if desired. The inorganic-organic hybrid coating 16 may be applied with a greater thickness if either or both of the hot-end coating 20 and the cold-end coating 22 are omitted. The inorganic-inorganic hybrid coating 16 may further vary in thickness to some extent over the glass substrate 14 despite the fact that the various coatings 16, 20, 22 are shown in FIGS. 3-3B as discrete idealized layers overlying one another sequentially. For instance, variances in the surface morphology of the exterior surface 18 of the glass substrate 14 and the hot-end and cold-end coatings 20, 22, if present, may contribute to some natural inconsistency in the thickness of the inorganic-organic hybrid coating 16 on the nanometer level. The inorganic-organic coating 16 and the hot-end and/or cold-end coatings 20, 22 may also penetrate each other along their interfaces to form an assimilated transition region of minimal, yet variable, thickness.

The inorganic-organic hybrid coating 16 is considered "monolithic" if the coating 16 has a generally consistent composition across its thickness and if the entire coating 16 is cured at the same time by exposure to UV light. An inorganic-organic coating 16 that is made by applying and curing two or more layers of the coating composition—with each of the layers being cured separately from one another and in succession—is not considered monolithic as that term is used here. The presence of only one monolithic inorganic-organic hybrid coating 16 over the exterior surface 18 of the glass substrate 14 is generally sufficient to enhance the clarity of the glass substrate 14 as indicated.

Referring now to FIG. 4, a method 400 of applying the inorganic-organic hybrid coating 16 to the glass container 10 is illustrated generally with a flow diagram. The method may include some or all of the following steps: (a) providing the glass container 10 defined by the glass substrate 14 (step 410); (b) applying the coating composition over the exterior surface 18 of the glass substrate 14 (step 420); and (c) exposing the coating composition to UV light to for a time sufficient to cure the coating composition into a monolithic inorganic-organic hybrid coating 16 (step 430). Other steps may also be performed during practice of this method even though such additional steps are not explicitly recited here. Skilled artisans will know and understand which additional steps may be practiced and how those other steps should be carried out in accordance with the method graphically illustrated in FIG. 4.

The glass container 10 may be provided, for example, by forming the glass substrate 14 into any desirable shape in accordance with a typical glass blowing procedure. This procedure involves receiving a glass raw material recipe (i.e., the batch) at a "hot-end" portion of the operation. The hot-end portion is where the batch is melted and initially formed into the glass container 10 albeit in pre-conditioned state. One or more furnaces, one or more forming machines, and all or part of one or more annealing lehrs are usually encompassed by the hot-end portion as is generally known by skilled artisans. The furnace(s) preferably heats the batch to between about 1300° C. and about 1600° C. to produce a glass melt. The forming machine(s) cuts gobs of the glass melt at a slightly lower temperature, but still high enough to accommodate plastic deformation, usually about 1050° C. to about 1200° C., and then fashions the gobs into the glass container 10. Once formed, the glass container 10 is briefly cooled to preserve its shape, and then re-heated to about 550° C. to about 750° C. in the annealing lehr(s) and cooled slowly to remove stress points that may have developed in the glass substrate 14. The hot-end coating 20, if applied, may be deposited onto the exterior surface 18 of the glass substrate 14 by any suitable technique before the container 10 enters the annealing lehr(s).

The formed glass container 10 is then received at a "cold-end" portion of the operation. The cold-end portion is where the final cooling of the container 10 occurs, usually between about 40° C. to about 130° C., as well as inspection (visually or by automated optical equipment) and packaging. The final downstream cooling segments of the annealing lehrs and the various inspection and packaging equipment pieces are typically encompassed by the cold-end portion as is generally known to skilled artisans. Then, after progressing through the cold-end portion, the container 10 may be subjected to any additional processing that may be required, and eventually packaged. The cold-end coating 22, if applied, may be deposited over the inorganic-organic hybrid coating 16 by any suitable technique after the container 10 exits the annealing lehr(s).

The coating composition may be applied over the exterior surface 18 of the glass substrate 14 at any time after the glass container 10 has emerged from the hot-end portion of the operation—preferably when the glass substrate 14 has reached at a temperature at or below about 100° C. Any suitable technique may be used to apply the coating composition including spraying, brushing, dip coating, spin coating, and curtain coating. The applied coating composition is then exposed to UV light for a period of time sufficient to cure the coating composition. Any source of UV light may be used including black lights, ultraviolet fluorescent lamps, gas-discharge lamps, ultraviolet LEDs, and/ or any other suitable source. The UV light may have a wavelength on the electromagnetic spectrum that ranges from about 50 nm to about 600 nm, more preferably about 300 nm to about 450 nm, and most preferably about 350 nm to about 450 nm. And depending on the specific wavelength of the UV light, the coating composition typically takes between about 10 seconds and 5 minutes to densify and fully cure, with shorter UV light wavelengths generally achieving shorter curing times. When UV light having the most preferred wavelength from about 180 nm to about 260 nm is utilized, for example, the coating composition may be exposed to the UV light for about 60 seconds to effectuate curing. The application of the coating composition and its curing with UV light is preferably performed once—which renders the inorganic-organic hybrid coating 16 monolithic.

The formation of the inorganic-organic hybrid coating 16 from the coating composition through UV light exposure is quick, simple, and consumes less energy than the formation other types of antireflective coatings for glass containers including a conventional inorganic $SiO_2$-based coating described before. Each of these efficiencies can be realized because the glass container 10 does not have to be subjected to another heat treatment after exiting the annealing lehr(s) in order to thermally cure the coating composition—exposure UV light is sufficient here. In other words, after the coating composition is applied, the container 10 does not have to be re-circulated back through the annealing lehr(s) or conveyed through a separate oven, lehr, and/or furnace to thermally cure the coating composition and derive the inorganic-organic hybrid coating 16. The coating composition can be cured sufficiently by exposure to UV light and does not have to be heated to temperatures above 100° C. after application to the glass substrate 14.

Conversely, the conventional inorganic $SiO_2$-based coating is usually synthesized from a traditional sol-gel method that includes application to the intended glass substrate followed by thermal curing. The process equipment needed to invoke such thermal curing may include a drying oven (to dry the sol-gel solution into a gel) and a high-temperature furnace (to thermally derive the final hardened coating from the viscous gel). The temperature needed to effectuate full thermal curing in the high-temperature furnace is often about 450° C. to about 550° C. But these heating requirements, especially those associated with the high-temperature furnace, may consume significant process time and energy. The ability to devote less relatively less time and energy to formation of the inorganic-organic hybrid coating 16 because of its receptiveness to UV curing is therefore a welcome contribution the art of glass manufacturing.

EXAMPLES

Below, and with reference to Tables 1-2, several examples of an inorganic-organic hybrid coating and their preparation are provided and explained, as well as a coating technique and performance results.

TABLE 1

| Examples | Silane (g) | Colloidal Silica Suspension (g) | N-Propanol (g) | Acetic Acid (g) | Water (g) | Total solution (g) |
|---|---|---|---|---|---|---|
| #1 | 1.38 | 0.00 | 22.76 | 0.26 | 0.60 | 25.00 |
| #2 | 0.00 | 1.08 | 23.06 | 0.26 | 0.60 | 25.00 |
| #3 | 1.03 | 0.27 | 22.84 | 0.26 | 0.60 | 25.00 |
| #4 | 0.99 | 1.30 | 21.89 | 0.25 | 0.57 | 25.00 |
| #5 | 0.52 | 1.00 | 23.16 | 0.27 | 0.05 | 25.00 |
| #6 | 0.26 | 1.00 | 23.45 | 0.26 | 0.03 | 25.00 |

TABLE 2

| Examples | Transmission gain λ555 nm (%) | Avg. Transmission gain λ380-750 nm (%) |
| --- | --- | --- |
| Example #1 | 1.03 | 0.43 |
| Example #2 | 1.49 | 1.26 |
| Example #3 | 1.91 | 1.52 |
| Example #4 | 1.85 | 1.53 |
| Example #5 | 2.93 | 2.65 |
| Example #6 | 3.76 | 3.38 |

Example 1

Coating Composition Preparation

A solution was prepared from 22.76 g of n-propanol, 0.26 g of acetic acid, 0.60 g of water, and 1.38 g of methacryloxypropyl-trimethoxysilane (MAPTMS). The solution was then stirred for 15 minutes. The n-propanol and the acetic acid were obtained from Fisher Scientific and the MAPTMS was obtained from Gelest, Inc. This coating composition did not include any colloidal silica.

Formation of a Comparative Coating

The coating composition was spin-coated at 1000 rpm onto the surface of a glass substrate that had a 2 inch by 2 inch surface area and a thickness of 3.3 mm. The coating composition was then cured by UV light for about 30 seconds with an electrodeless "D bulb" obtained from Fusion UV Systems (Galthersburg, Md.). The electrodeless "D bulb" had a UV light output spectra primarily between about 350 nm and about 450 nm. After curing, the comparative coating had a thickness of about 130 nm.

Antireflectivity Performance of the Comparative Coating

The optical transmission gain at $\lambda_{555}$ nm and the average optical transmission gain at $\lambda_{380-750}$ nm provided by the comparative coating were observed to be 1.03% and 0.43%, respectively, relative to the glass substrate.

Example 2

Coating Composition Preparation

A solution was prepared from 23.06 g of n-propanol, 0.26 g of acetic acid, 0.60 g of water, and 1.08 g of colloidal silica. The solution was then stirred for 15 minutes. The n-propanol and the acetic acid were obtained from Fisher Scientific and the colloidal silica was obtained from BYK-Chemie (BYK-LP X 20470). This coating composition did not include any MAPTMS.

Formation of a Comparative Coating

The coating composition was spin-coated at 1000 rpm onto the surface of a glass substrate that had a 2 inch by 2 inch surface area and a thickness of 3.3 mm. The coating composition was then cured by UV light for about 30 seconds with an electrodeless "D bulb" obtained from Fusion UV Systems (Galthersburg, Md.). The electrodeless "D bulb" has a UV light output spectra primarily between about 350 nm and about 450 nm. After curing, the comparative coating had a thickness of about 130 nm.

Antireflectivity Performance of the Comparative Coating

The optical transmission gain at $\lambda_{555}$ nm and the average optical transmission gain at $\lambda_{380-750}$ nm provided by the comparative coating were observed to be 1.49% and 1.26%, respectively, relative to the glass substrate.

Example 3

Coating Composition Preparation

A solution was prepared from 22.84 g of n-propanol, 0.26 g of acetic acid, 0.60 g of water, 0.27 g of MAPTMS, and 1.03 g of colloidal silica. The solution was then stirred for 15 minutes. The n-propanol, acetic acid, MAPTMS, and colloidal silica were obtained from the same sources previously mentioned.

Formation of an Inorganic-organic Hybrid Coating

The coating composition was spin-coated at 1000 rpm onto the surface of a glass substrate that had a 2 inch by 2 inch surface area and a thickness of 3.3 mm. The coating composition was then cured by UV light for about 30 seconds with an electrodeless "D bulb" obtained from Fusion UV Systems (Galthersburg, Md.) to form an inorganic-organic hybrid coating. The electrodeless "D bulb" has a UV light output spectra primarily between about 350 nm and about 450 nm. After curing, the inorganic-organic hybrid coating had a thickness of about 130 nm.

Antireflectivity Performance of the Inorganic-Organic Hybrid Coating

The optical transmission gain at $\lambda_{555}$ nm and the average optical transmission gain at $\lambda_{380-750}$ nm provided by the organic-inorganic hybrid coating were observed to be 1.91% and 1.52%, respectively, relative to the glass substrate.

Example 4

Coating Composition Preparation

A solution was prepared from 21.89 g of n-propanol, 0.25 g of acetic acid, 0.57 g of water, 0.99 g of MAPTMS, and 1.30 g of colloidal silica. The solution was then stirred for 15 minutes. The n-propanol, acetic acid, MAPTMS, and colloidal silica were obtained from the same sources previously mentioned.

Formation of an Inorganic-organic Hybrid Coating

The coating composition was spin-coated at 1000 rpm onto the surface of a glass substrate that had a 2 inch by 2 inch surface area and a thickness of 3.3 mm. The coating composition was then cured by UV light for about 30 seconds with an electrodeless "D bulb" obtained from Fusion UV Systems (Galthersburg, Md.) to form an inorganic-organic hybrid coating. The electrodeless "D bulb" has a UV light output spectra primarily between about 350 nm and about 450 nm. After curing, the inorganic-organic hybrid coating had a thickness of about 130 nm.

Antireflectivity Performance of the Inorganic-organic Hybrid Coating

The optical transmission gain at $\lambda_{555}$ nm and the average optical transmission gain at $\lambda_{380-750}$ nm provided by the inorganic-organic hybrid coating were observed to be 1.85% and 1.53%, respectively, relative to the glass substrate.

Example 5

Coating Composition Preparation

A solution was prepared from 23.16 g of n-propanol, 0.27 g of acetic acid, 0.05 g of water, 0.52 g of MAPTMS, and 1.0 g of colloidal silica. The solution was then stirred for 3 hours. The n-propanol, acetic acid, MAPTMS, and colloidal silica were obtained from the same sources previously mentioned.

Formation of an Inorganic-organic Hybrid Coating

The coating composition was spin-coated at 1000 rpm onto the surface of a glass substrate that had a 2 inch by 2 inch surface area and a thickness of 3.3 mm. The coating composition was then cured by UV light for about 30 seconds with an electrodeless "D bulb" obtained from Fusion UV Systems (Galthersburg, Md.) to form an inorganic-organic hybrid coating. The electrodeless "D bulb" has a UV light output spectra primarily between about 350 nm and about 450 nm. After curing, the inorganic-organic hybrid coating had a thickness of about 130 nm.

Antireflectivity Performance of the Inorganic-organic Hybrid Coating

The optical transmission gain at $\lambda_{555}$ nm and the average optical transmission gain at $\lambda_{380-750}$ nm provided by the inorganic-organic hybrid coating were observed to be 2.93% and 2.65%, respectively, relative to the glass substrate.

Example 6

Coating Composition Preparation

A solution was prepared from 23.45 g of n-propanol, 0.26 g of acetic acid, 0.03 g of water, 0.26 g of MAPTMS, and 1.0 g of colloidal silica. The solution was then stirred for 1 hour. The n-propanol, acetic acid, MAPTMS, and colloidal silica were obtained from the same sources previously mentioned.

Formation of an Inorganic-organic Hybrid Coating

The coating composition was spin-coated at 1200 rpm onto the surface of a glass substrate that had a 2 inch by 2 inch surface area and a thickness of 3.3 mm. The coating was then cured by UV light for about 30 seconds with an electrodeless "D bulb" obtained from Fusion UV Systems (Galthersburg, Md.) to form an inorganic-organic hybrid coating. The electrodeless "D bulb" had a UV light output spectra primarily between about 350 nm and about 450 nm. After curing, the inorganic-organic hybrid coating had a thickness of about 130 nm.

Antireflectivity Performance of the Inorganic-organic Hybrid Coating

The optical transmission gain at $\lambda_{555}$ nm and the average optical transmission gain at $\lambda_{380-750}$ nm provided by the inorganic-organic hybrid coating were observed to be 3.76% and 3.38%, respectively, relative to the glass substrate.

There thus has been disclosed methods of coating glass containers and methods of manufacturing glass containers that at least partially satisfy one or more of the objects and aims previously set forth. The disclosure has been presented in conjunction with several exemplary embodiments, and additional modifications and variations have been discussed. Other modifications and variations readily will suggest themselves to persons of ordinary skill in the art in view of the foregoing discussion. The disclosure is intended to embrace all such modifications and variations as fall within the spirit and broad scope of the appended claims

The invention claimed is:

1. A method of applying an inorganic-organic hybrid coating having anti-reflective properties to a glass container, the method comprising:
   (a) applying a coating composition over an exterior surface of a glass substrate that defines a shape of the glass container, the coating composition consisting of (1) 1.0 wt. % to 6.0 wt. % of a UV curable organofunctional silane that includes an alkoxy functional group and an acrylic ester functional group, (2) 1.0 wt. % to 6.0 wt. % colloidal silica, (3) 0.10 wt. % to 5.0 wt. % water, (4) 1.0 wt. % to 10 wt. % of a catalyst, and (5) an organic solvent; and
   (b) exposing the coating composition to UV light for a time sufficient to cure the coating composition into a transparent monolithic inorganic-organic hybrid coating that comprises an inorganic polymer component and an organic polymer component, the inorganic-organic hybrid coating providing an optical transmission gain relative to the glass substrate of at least 1% for light at a wavelength of 555 nm.

2. The method set forth in claim 1 wherein the inorganic-organic coating provides an average optical transmission gain relative to the glass substrate of at least 1% for light over a wavelength range of 380 nm to 750 nm.

3. The method set forth in claim 1 wherein the UV curable organofunctional silane includes a methoxy group and a methacryloxy group.

4. The method set forth in claim 1 wherein the UV curable organofunctional silane comprises at least one of methacryloxypropyltrimethoxysilane, acryloxypropyltrimethoxysilane, or dimethacryloxypropyl-dimethoxysilane.

5. The method set forth in claim 1 wherein the inorganic-organic hybrid coating has a thickness in the range of 100 nm to 200 nm.

6. The method set forth in claim 1 wherein the coating composition is not heated above 100° C. after being applied over the exterior surface of the glass substrate.

7. The method set forth in claim 1 wherein the glass container includes only one monolithic inorganic-organic hybrid coating over the exterior surface of the glass substrate.

8. A method of applying an inorganic-organic hybrid coating having anti-reflective properties to a glass container, the method comprising:
   (a) providing a glass container that includes a soda-lime glass substrate that defines a shape of the container;
   (b) applying a coating composition over an exterior surface of the glass substrate, the coating composition consisting of (1) 1.0 wt. % to 6.0 wt. % of a UV curable organofunctional silane that includes an alkoxy functional group and an acrylic ester functional group, (2) 1.0 wt. % to 6.0 wt. % colloidal silica, (3) 0.10 wt. % to 5.0 wt. % water, (4) 1.0 wt. % to 10 wt. % of a catalyst, and (5) an organic solvent; and
   (c) exposing the coating composition to UV light for a time sufficient to cure the coating composition into a monolithic inorganic-organic hybrid coating.

9. The method set forth in claim 8 wherein step (a) comprises forming the glass container and annealing the glass container.

10. The method set forth in claim 8 wherein the inorganic-organic hybrid coating provides an average optical transmission gain relative to the glass substrate of at least 1.0% for light over a wavelength range of 380 nm to 750 nm.

11. The method set forth in claim 8 wherein the UV curable organofunctional silane comprises at least one of methacryloxypropyltrimethoxysilane, acryloxypropyltrimethoxysilane, or dimethacryloxypropyl-dimethoxysilane.

12. The method set forth in claim 8 wherein the catalyst is an acid.

13. The method set forth in claim 8 wherein the inorganic-organic hybrid coating has a thickness in the range of 100 nm to 200 nm.

14. The method set forth in claim 8 wherein the coating composition is not heated above 100° C. after being applied over the exterior surface of the glass substrate.

15. The method set forth in claim 8 further comprising applying a hot-end coating to the exterior surface of the glass substrate before applying the coating composition, and applying a cold-end coating over the inorganic-organic hybrid coating.

16. The method set forth in claim 8 wherein the glass container includes only one monolithic inorganic-organic hybrid coating over the exterior surface of the glass substrate.

17. The method set forth in claim 8 wherein the inorganic-organic hybrid coating provides an optical transmission gain relative to the glass substrate of at least 1% for light at a wavelength of 555 nm.

* * * * *